United States Patent [19]
Bokstrom

[11] Patent Number: 5,997,689
[45] Date of Patent: Dec. 7, 1999

[54] METHOD OF PRE-TREATING SECONDARY FIBERS WITH OXYGEN IN A DISPERSER

[75] Inventor: Monica Bokstrom, Kovland, Sweden

[73] Assignee: AGA Aktienbolag, Lidingo, Sweden

[21] Appl. No.: 08/817,616

[22] PCT Filed: Oct. 5, 1995

[86] PCT No.: PCT/SE95/01146

§ 371 Date: Jul. 3, 1997

§ 102(e) Date: Jul. 3, 1997

[87] PCT Pub. No.: WO96/12062

PCT Pub. Date: Apr. 25, 1996

[30] Foreign Application Priority Data

Oct. 13, 1994 [SE] Sweden ................................ 9403494

[51] Int. Cl.$^6$ .................................................. D21C 5/02
[52] U.S. Cl. .................................. 162/6; 162/56; 162/65
[58] Field of Search ................................ 162/4, 6, 7, 56, 162/57, 65

[56] References Cited

U.S. PATENT DOCUMENTS

| | | | |
|---|---|---|---|
| 4,339,206 | 7/1982 | Ahs ......................................... | 366/307 |
| 4,577,974 | 3/1986 | Prough et al. .......................... | 366/307 |
| 4,909,900 | 3/1990 | Matzke et al. ........................... | 162/4 |
| 5,211,809 | 5/1993 | Naddeo et al. ......................... | 162/6 |
| 5,234,544 | 8/1993 | Naddeo .................................... | 162/5 |
| 5,518,580 | 5/1996 | Ortner et al. ........................... | 162/4 |

FOREIGN PATENT DOCUMENTS

| | | |
|---|---|---|
| 0 557 651 | 9/1993 | European Pat. Off. . |
| 1239047 | 7/1960 | France . |

OTHER PUBLICATIONS

Douglas, W. R. "Studies with . . . Pulp mixer", TAPPI Seminar Notes, pp. 19–23. Reeves, 1985.

Markham L.D., "Oxygen Bleaching . . . Fiber Grades", Tappi Journal, pp. 168–174, Dec. 1988.

Reeve D. W, "Mixing Gases,. . . Bleaching", Tappi Journal, pp. 84–88, Jul. 1986.

Nasman, Lars E., Medium–consistency oxygen bleaching—a step toward simplified bleaching systems:, 490923E02.81, Brolins Offset 219 120, Sunds Defibrator, Sundsvall, Sweden.

*Primary Examiner*—Dean T. Nguyen
*Attorney, Agent, or Firm*—Pearne, Gordon, McCoy & Granger LLP

[57] ABSTRACT

A method of bleaching secondary fibers. A secondary fiber pulp is first slushed and then transferred at a consistency of 20–40% to a disperser. In the disperser, the secondary fiber pulp is mechanically treated and mixed so that ink particles in the secondary fiber pulp are dispersed throughout the secondary fiber pulp. While the secondary fiber pulp is being treated and mixed in the disperser, oxygen is delivered to the disperser so as to distribute the oxygen within the secondary fiber pulp.

12 Claims, 2 Drawing Sheets

METHOD OF PRE-TREATING SECONDARY FIBERS WITH OXYGEN IN A DISPERSER

BACKGROUND OF THE INVENTION

The present invention relates to a method of pre-treating secondary fibers prior to bleaching.

It is known when bleaching secondary fibers to allow the pulp to pass through a disperser in order to disperse any ink particles or like particles that may remain. After having passed through the dispersion stage, the pulp is transported to a bleaching stage, in which the bleaching chemicals peroxide, alkali and silicate are added. This known process consumes a large amount of the relatively expensive peroxide. It is also known to bleach secondary fibers by supplying oxygen to the system.

The known bleaching processes in which oxygen is used are relatively complicated. The oxygen treatment process is effected in a separate bleaching stage, in a pressurized reactor with a reactor residence time as long as at least ten minutes. The oxygen treatment process is also effected under alkaline conditions and at high pressure. One kilogram of peroxide is about ten times the price of oxygen. It is therefore desirable to keep the consumption of peroxide down to the lowest possible level and to replace peroxide with, for instance, oxygen to the greatest possible extent. Normally, it is not difficult to achieve desired pulp brightness when bleaching. When problems concerning brightness occur, it may be because the secondary paper contained a large percentage of mechanical pulp, large quantities of printing ink or not readily bleached ink or colors. Consequently, it is not only important to maintain a low peroxide consumption level, but also to increase brightness of the pulp in the bleaching process. EP-A-557 651 discloses a process for treatment of secondary fibre pulp. This known process is adapted to clean and treat secondary fibers of various qualities in one single process. This document discloses a screw digester, i.e. a digester which comprises a feeding screw and in which the pulp is subjected to chemical pulping. During the chemical pulping, usual chemical additives, i.e. NaOH, $H_2O_2$ and $O_2$, are added. The pulping takes place under high pressure, 70–135 psi (490–950 kPa) and at a temperature of 70–110° C. The residence time in the pulper is at least 30 min. The purpose of the feeding screw of the screw digester disclosed is to transport the pulp from the inlet and to the outlet end and not to mechanically process or mix the pulp. Furthermore, it is not mentioned in EP-A-557 651 that the treatment in the screw digester would result in a uniform distribution of the ink particles or the added oxygen in the secondary fibre pulp.

U.S. Pat. No. 4,909,900 discloses the treatment of a fibre pulp mixture, which may include secondary fibers, by means of a disperser. Example 1 refers to reductive bleaching by sodium dithionite and example 2 to oxidative bleaching by hydrogen peroxide. It is not mentioned that oxygen may be used together with the bleaching technique disclosed in this document. In example 2 it is more closely disclosed that a solution comprising one percent of hydrogen peroxide is delivered to the pulp by means of a nozzle in a feeding conduit from which the pulp is introduced to a feeding screw transporting the pulp to the disperser. Thus, the hydrogen peroxide is added to the pulp at a position upstream the disperser in which the mechanical treatment of the pulp takes place.

U.S. Pat. No. 5,234,544 discloses the inking and bleaching of secondary fibre pulp by means of oxygen and particularly that the pulp is brought into contact with alkali, oxygen and a surfactant in a pressurized reaction zone. The residence time in the reaction zone is relatively long. In Example 1 it is disclosed that the pulp is supplied to the reactor at a relatively low consistency of 10% and that the pulp is retained in the reactor and periodically mixed therein by means of a high shear mixer.

SUMMARY OF THE INVENTION

The object of the present invention is therefore to provide a simple method which will enable secondary fibers to be bleached more effectively.

This object is achieved in accordance with the aforesaid method by virtue of supplying oxygen in accordance with the proposal set forth in the characterizing clause of claim 1, and in accordance with the aforesaid arrangement having the characteristic features set forth in the characterizing clause of claim 7.

Thus, the present invention enables the brightness of the bleached pulp to be maintained while making large savings in peroxide consumption; alternatively, the brightness of the pulp can be further enhanced with maintained peroxide consumption. In other words, the present invention enables both oxygen and peroxide to be used in a very simple and a very effective manner when bleaching secondary fibers. This is of the greatest significance, since the combination of peroxide and oxygen when bleaching secondary fibres results in a synergistic effect whereby a further increase in pulp brightness is obtained. Since oxygen is now supplied in an existing process stage for mechanical treatment and mixing of the pulp, no additional, separate reactor is required for supplying the oxygen. Furthermore, the oxygen treatment process need not be carried out at the high pressure that prevails in such a separate reactor, since the mechanical treatment and mixing of the pulp that takes place in the mechanical treatment apparatus is sufficient to distribute the oxygen uniformly and finely throughout the pulp. It will be understood that all this makes the process equipment simpler. The process time can also be kept shorter, since the admixture of oxygen with the pulp in a separate reactor requires a long residence time, whereas the admixture of oxygen in the pulp in the mechanical treatment apparatus is effected relatively quickly as a result of the vigorous, powerful, mechanical treatment and mixing processes that take place.

Claims 2–6 and 8–11 define advantageous embodiments of the inventive method and of the inventive apparatus respectively. Claims 3 to 6 define the conditions in the mechanical pulp treatment apparatus by means of which the good pulp bleaching results are achieved.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
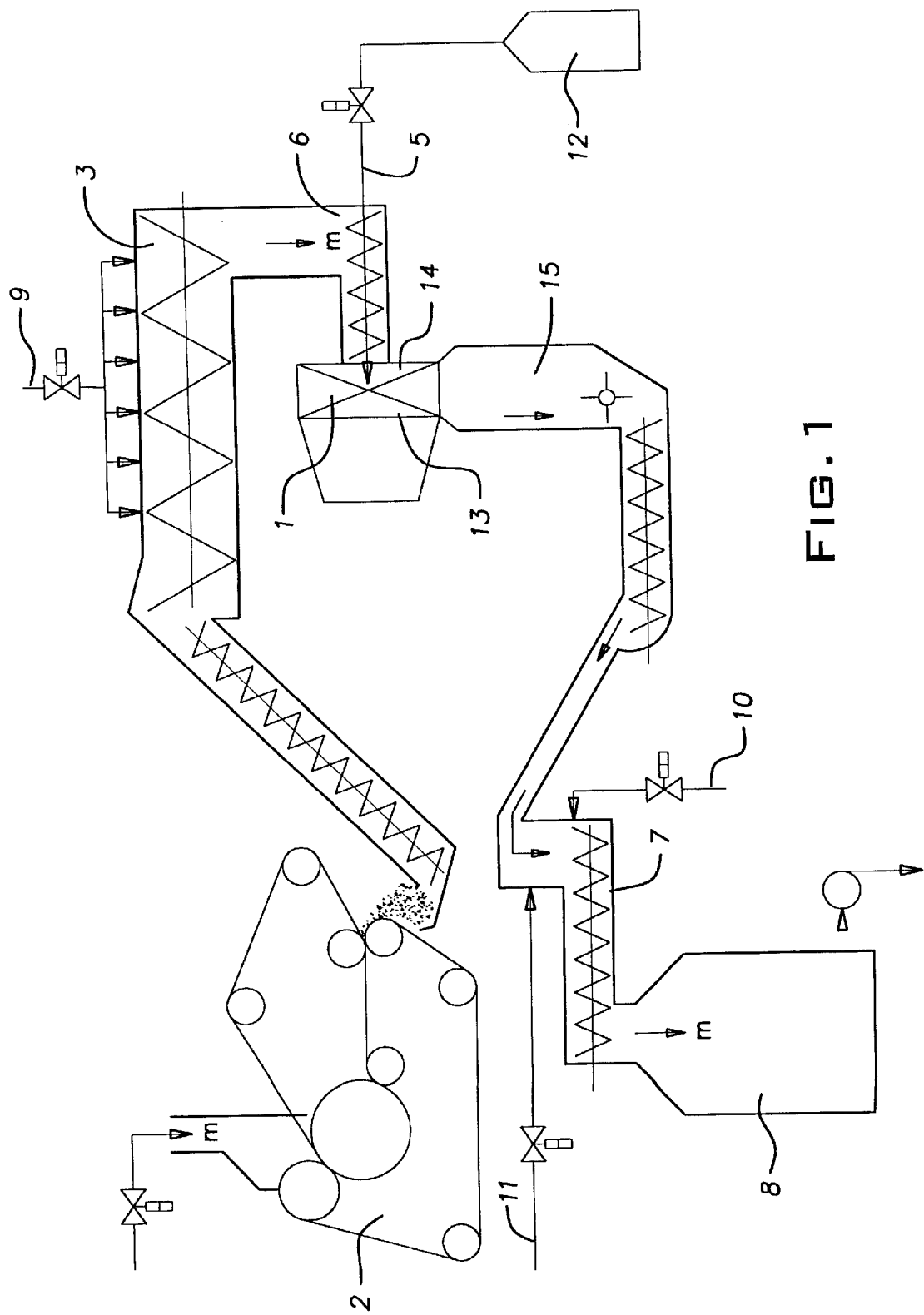
FIG. 1 shows a schematic illustration of dispersion and bleaching stages.

In brief, the recycling process can be applied to convert secondary or recycled paper to useful pulp in the following way. The secondary paper is delivered to a high concentration slusher, or pulper, together with such chemicals as NaOH and hydrogen peroxide, for instance. The paper is pulped at a temperature of about 15° C., whereafter the pulp is screened, washed and de-inked in different stages with the aid of mutually different, known methods. After having been subjected to these process stages, the concentration of the pulp is increased to a higher level, for instance to a concentration of 20 and 40% in a double-wire press, for example. The pulp is then heated in a steam, or vapor, mixer to a temperature of between 60 and 100° C., and then transported to a disperser. No chemicals are normally added in this stage of the process. After the dispersion process, the pulp is transported with the aid of a screw feeder, to which bleaching chemicals, for instance $H_2O_2$ and auxiliary chemicals, and steam are delivered. The pulp is transported by the screw feeder to the bleaching tower, where it is kept for a given period of time. After being discharged from the bleaching tower, the pulp is neutralized to a suitable pH prior to being transported to a pulp silo and to the paper mill.

When practicing the inventive method, the pulp m is supplied, in a first process-stage, to a slushing device. Thereafter the pulp is exposed to a de-inking treatment in one or more stages according to known technique. After such a treatment, in which at least a part of the ink particles is removed, the pulp m is transported to a press 2, for instance, in which it has been pressed to a concentration of between 15 and 50%, preferably 20 to 40%, and then particularly to about 30%. Therefrom the pulp m is transported to a steam mixer 3, for instance in the form of a screw conveyor. The pulp m is heated to a high temperature of between 60 and 100° C., preferably between 80 and 95° C., and then particularly to 90° C., with the aid of steam delivered to the screw conveyor through the medium of supply lines 9. The thus heated pulp having the aforesaid relatively high dry solids content, i.e. with the high pulp consistency, is then delivered to a disperser 1.

The disperser 1 is a device which refines, mixes and works the pulp mechanically. The purpose of the device is to disperse throughout the pulp any ink particles that may remain, so that these remaining ink particles will scatter light more effectively and thus make the pulp appear brighter, while also making the ink particles more accessible to the bleaching agent and therewith responsive to reaction therewith. In the case of the illustrated embodiment, there is used a disc disperser 1 which includes two mutually opposing discs which rotate in opposite directions relative to one another and which are identified in the drawing by reference numerals 13 and 14. The pulp m is delivered to the centre of the disperser, between its mutually rotating discs 13, 14 and is there subjected to vigorous, powerful, mechanical treatment and mixing over a short period of time, such that the pulp will not lose its mechanical strength properties. This treatment process involves mixing the pulp and disintegrating large agglomerations or clumps. It will be obvious to those skilled in this art that other types of dispersers may also be used. The disperser may, for instance, have the form of an appropriate grinding, attrition, refining or shredding device.

According to the embodiment of the invention a delivery line 5 is opening out into the centre of the disperser. Through this line 5 gaseous oxygen is delivered from an oxygen source 12 directly into the pulp m present in the centre of the disperser 1. The oxygen is delivered at a pressure of between 0 and 10 bars, preferably about 2–6 bars, and in an amount corresponding from 2 to 20 kilogram per ton of dry pulp, preferably about 7–10 kilogram per ton pulp. As will be understood, remaining ink particles in the pulp are finely dispersed as a result of the vigorous, powerful mechanical working of the pulp in the disperser 1, and the oxygen is also finely distributed uniformly throughout the pulp m. As before mentioned, the pulp m, delivered from the steam mixer 3, is transported into the disperser 1 by means of a screw conveyor 6, for instance. The risk of the oxygen supplied flowing back in a direction reverse to the process direction is very slight, since the pulp m is pressed into the disperser 1. The atmosphere in the disperser 1 is saturated with steam, which enhances the reliability, or security, of the process. As the pulp m leaves the disperser 1 through the outlet device 15, the pulp is conveyed by a screw conveyor 7 to a bleaching tower 8. Steam is delivered to the pulp in the screw conveyor 7 via the delivery device 10, whereas bleaching chemicals such as peroxide, alkali and silicate are delivered through the delivery device 11.

There is described in the following an experiment in which it was possible to evaluate the effect that oxygen delivered to the disperser 1 had on the brightness of the bleached pulp m. The tests were carried out in accordance with the process described above in which the supply of oxygen and other chemicals were the sole changes in the process. The amount of peroxide delivered to the system was decreased as the brightness of the pulp increased after the bleaching process.

The tests included
a) a reference test in which no oxygen was supplied;
b) tests in which oxygen was supplied;
c) tests which included a combined supply of oxygen and sodium hydroxide; and
d) tests which included a combined supply of oxygen, sodium hydroxide and hydrogen peroxide to the disperser.

It was endeavoured to achieve a bleached pulp of desired brightness in all of the tests, in this case a brightness of 80–84% ISO. The total amount of sodium hydroxide supplied was not changed in tests c) and d), and the supply of sodium hydroxide was instead decreased to a corresponding extent in the bleaching stage. It will be noted, however, that there is a relationship between the supply of peroxide and the supply of NaOH in the bleaching stage. Neither were NaOH and hydrogen peroxide delivered directly into the disperser, but were delivered instead to the steam mixer located upstream of the disperser in the process. The process conditions varied radically during the course of the tests, mainly due to changes in the incoming pulp, the brightness and bleachability of which varied greatly. Generally, the variations observed during one calendar day were smaller than the variations that occurred from one day to the next. The brightness of the de-inked pulp and the supply of peroxide thereto were kept at a constant level during the first days of the test. After having supplied oxygen to the process, the brightness was found to have increased by three units. Thus, the brightness of the pulp was doubled by the bleaching process, i.e. from three units to six units. The supply of peroxide was decreased during the following days of the test, while commencing the oxygen supply at the same time. Data relating to brightness changes when bleaching in the absence of oxygen is available.

The mean values of the daily mean values are given in Table 1, which shows that the supply of oxygen alone provides the best result, with more than a doubling in the brightness of the pulp with each kilogram of peroxide supplied. A supply of sodium hydroxide or peroxide+sodium hydroxide upstream of the disperser did not improve on the results obtained with oxygen. The difference is relatively small, which can thus be taken as an indication that there is no difference at all when oxygen is supplied alone or together with part of the bleaching chemicals. This is somewhat surprising. One explanation may be that no true reaction takes place with the oxygen in the disperser. The delivery of oxygen to the disperser results in an effective mixture of oxygen bubbles in the pulp of high concentration, so that the oxygen becomes uniformly and finely distributed in the pulp. When the pulp then reaches the bleaching chemical mixer in which peroxide is added, the mixture of oxygen and peroxide constitutes the active bleaching components. In order to confirm the improvements achieved with oxygen still further, data was chosen in another way; see Table 2. In this case, data was excluded when the brightness of the incoming de-inked pulp was low or high. Thus, data was also calculated when the resultant brightness of the bleached pulp lay above or beneath the range 80–84% ISO. It is also evident from this alternative method that the addition of oxygen results in improved peroxide bleaching, and that the amount of peroxide consumed for a given increase in brightness is roughly half the amount of peroxide that is consumed when no oxygen is added.

Figure 2:
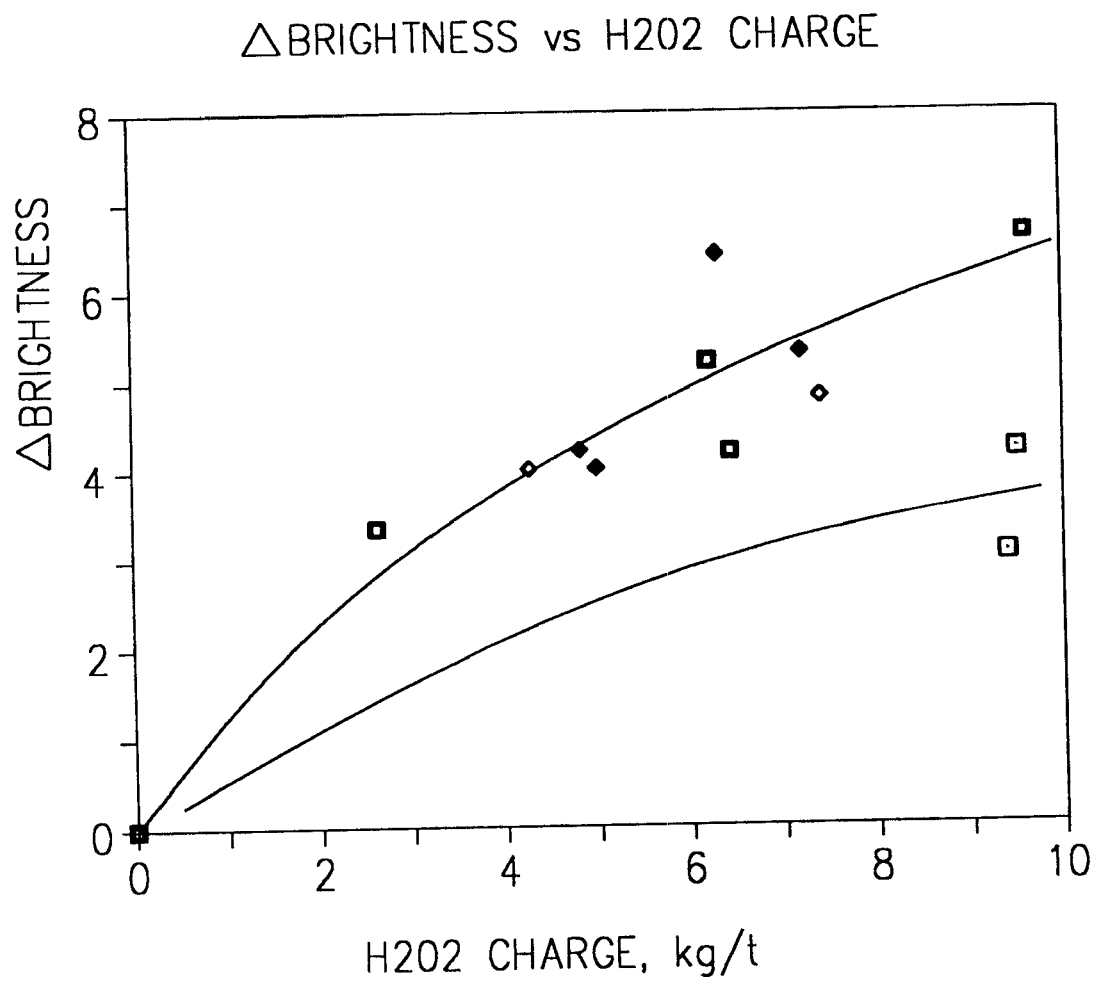
FIG. 2 shows a graph of change in pulp brightness versus charge of peroxide.

The graph, or diagram, illustrated in FIG. 2 shows how brightness of the pulp varied with the supply of peroxide in the different tests.

As will be seen from the diagram in FIG. 2, when bleaching pulp with peroxide, the brightness of the pulp increases when oxygen is added thereto. Whether oxygen is supplied together with alkali or peroxide would seem to make no difference.

TABLE 1

Bleached brightness 80–84%

| | Deinked brightness (%) | $H_2O_2$-charge (kg/t) | Bleached brightness (%) | Δ Brightness | Δ Brightness/ kg $H_2O_2$ |
|---|---|---|---|---|---|
| Ref | 78.3 | 9.4 | 81.9 | 3.6 | 0.38 |
| $O_2$ | 77.9 | 5.8 | 82.8 | 5.0 | 0.86 |
| $O_2$ + NaOH | 77.7 | 6.2 | 82.5 | 4.8 | 0.77 |
| $O_2$ + NaOH + $H_2O_2$ | 77.9 | 5.8 | 82.3 | 4.4 | 0.76 |

TABLE 2

Lowest & highest values of incoming brightness excluded.

| | Deinked brightness (%) | $H_2O_2$-charge (kg/t) | Bleached brightness (%) | Δ Brightness | Δ Brightness/ kg $H_2O_2$ |
|---|---|---|---|---|---|
| Ref | 78.3 | 9.4 | 81.9 | 3.6 | 0.38 |
| $O_2$ | 78.1 | 7.0 | 83.5 | 5.4 | 0.77 |
| $O_2$ + NaOH | 77.7 | 6.3 | 82.4 | 4.7 | 0.75 |
| $O_2$ + NaOH + $H_2O_2$ | 77.9 | 5.8 | 82.3 | 4.4 | 0.76 |

I claim:

1. A method of pre-treating secondary fibers prior to bleaching, said method comprising the steps of:
   slushing a secondary fiber pulp;
   supplying the secondary fiber pulp at a consistency of 20–40% to a disperser;
   mechanically treating and mixing the secondary fiber pulp in said disperser in such a manner that ink particles present in the secondary fiber pulp are dispersed throughout the secondary fiber pulp;
   delivering oxygen to the disperser in a manner to distribute the oxygen within the secondary fiber pulp; and
   transferring the secondary fiber pulp from the disperser to a bleaching tower.

2. A method according to claim 1, wherein said disperser comprises a disc disperser having two mutually opposing discs.

3. A method according to claim 1, wherein the secondary fiber pulp processed in the disperser has a temperature of about 60–100° C.

4. A method according to claim 3, wherein the secondary fiber pulp processed in the disperser has a temperature of about 90° C.

5. A method according to claim 1, wherein the oxygen is delivered to the disperser in an amount corresponding to 2–20 kg/ton dry pulp.

6. A method according to claim 5, wherein the oxygen is delivered to the disperser at a pressure of 0 to 10 bars above atmospheric pressure.

7. A method according to claim 6, wherein the oxygen is delivered from an oxygen source through a pipe having an oxygen discharge end in the center of the disperser.

8. A method according to claim 6, wherein the oxygen is delivered to the disperser at a pressure of about 2 to 6 bars above atmospheric pressure.

9. A method according to claim 5, wherein the oxygen is delivered to the disperser in an amount corresponding to 7–10 kg/ton dry pulp.

10. A method according to claim 1, wherein the oxygen is delivered directly to the disperser from an oxygen source.

11. A method according to claim 1, wherein the oxygen is mixed into the secondary fiber pulp substantially in the absence of hydrogen peroxide and sodium hydroxide.

12. A method according to claim 1, wherein the secondary fiber pulp is transferred from the disperser to the bleaching tower by a screw conveyor.

* * * * *

UNITED STATES PATENT AND TRADEMARK OFFICE
CERTIFICATE OF CORRECTION

PATENT NO. : 5,997,689
DATED : December 7, 1999
INVENTOR(S) : Bokstrom

It is certified that error appears in the above-indentified patent and that said Letters Patent is hereby corrected as shown below:

On the Title Page, Section [73], delete "Aktienbolag" and insert --Aktiebolag--.

Column 3, Line 20, delete "pulp m" and insert --pulp m--.

Column 3, Line 30, delete "pulp m" and insert --pulp m--.

Column 3, Line 48, delete "pulp m" and insert --pulp m--.

Column 3, Line 62, delete "pulp m" and insert --pulp m--.

Column 4, Line 4, delete "pulp m" and insert --pulp m--.

Column 4, Line 11, delete "pulp m" and insert --pulp m--.

Signed and Sealed this

Second Day of January, 2001

Attest:

*Attesting Officer*

Q. TODD DICKINSON
*Commissioner of Patents and Trademarks*